United States Patent
Nakata

(10) Patent No.: US 9,001,345 B2
(45) Date of Patent: Apr. 7, 2015

(54) PRINTING SYSTEM, CONTROL METHOD FOR INFORMATION PROCESSING APPARATUS, AND NON-TRANSITORY COMPUTER-READABLE MEDIUM FOR INSTALLING A PRINTER DRIVER

(71) Applicant: Canon Kabushiki Kaisha, Tokyo (JP)

(72) Inventor: Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/316,870

(22) Filed: Jun. 27, 2014

(65) Prior Publication Data

US 2015/0029527 A1    Jan. 29, 2015

(30) Foreign Application Priority Data

Jul. 25, 2013    (JP) .................................. 2013-154962

(51) Int. Cl.
G06F 3/12       (2006.01)
G06K 15/02      (2006.01)

(52) U.S. Cl.
CPC .................................. G06K 15/1805 (2013.01)

(58) Field of Classification Search
None
See application file for complete search history.

(56) References Cited

U.S. PATENT DOCUMENTS

| | | | |
|---|---|---|---|
| 2004/0265029 A1* | 12/2004 | Ota .................................. | 400/76 |
| 2005/0052660 A1* | 3/2005 | Sabbagh et al. ................ | 358/1.1 |
| 2005/0225795 A1* | 10/2005 | Nuggehalli et al. .......... | 358/1.15 |
| 2006/0173670 A1* | 8/2006 | Engel et al. ..................... | 703/26 |
| 2006/0274355 A1* | 12/2006 | Ferlitsch et al. ............. | 358/1.15 |
| 2012/0147414 A1 | 6/2012 | Hutchings et al. | |

* cited by examiner

Primary Examiner — Jeremiah Bryar

(74) Attorney, Agent, or Firm — Carter, DeLuca, Farrell & Schmidt, LLP

(57) ABSTRACT

In a printing system, the information processing apparatus includes: a first obtaining unit which obtains hardware information of a printing apparatus at the time of installation of a printer driver associated with the printing apparatus; a unit which decides on a printer driver to be installed from among a plurality of printer drivers that are associated with the printing apparatus and differ from one another in specifications based on the hardware information; a second obtaining unit which transmits to the printing apparatus attribute information of the printer driver that has been decided on, and obtains as a response thereto a configuration file for expanding functions of the printer driver that has been decided on; and a unit which installs the printer driver that has been decided on, and performs functional expansion for the printer driver using the obtained configuration file.

8 Claims, 19 Drawing Sheets

F I G. 6

```
*Feature:PaperSize                                           ~1711
{
        *rcNameID:=PAPER_SIZE_DISPLAY
        *Option:LETTER
        {
                *rcNameID:=RCID_DMPAPER_SYSTEM_NAME
                *PrintableArea:=PAIR(4860,6360)
                *PrintableOrigin:=PAIR(120,120)
        }
        *Option:A4
        {
                *rcNameID:=RCID_DMPAPER_SYSTEM_NAME
                *PrintableArea:=PAIR(4720,6774)
                *PrintableOrigin:=PAIR(120,120)
        }
}
```

```
*Feature:PaperSize                                           ~1712
{
        *Option:A3
        {
                *rcNameID:=RCID_DMPAPER_SYSTEM_NAME
                *PrintableArea:=PAIR(6774,9680)
                *PrintableOrigin:=PAIR(120,120)
        }
}
```

```
*Feature:PaperSize                                           ~1721
{
        *rcNameID:=PAPER_SIZE_DISPLAY
        *Option:LETTER
        {
                *rcNameID:=RCID_DMPAPER_SYSTEM_NAME
                *PrintableArea:=PAIR(4800,6380)
                *PrintableOrigin:=PAIR(150,110)
        }
        *Option:A4
        {
                *rcNameID:=RCID_DMPAPER_SYSTEM_NAME
                *PrintableArea:=PAIR(4662,6794)
                *PrintableOrigin:=PAIR(150,110)
        }
}
```

```
*Feature:PaperSize                                           ~1722
{
        *Option:A3
        {
                *rcNameID:=RCID_DMPAPER_SYSTEM_NAME
                *PrintableArea:=PAIR(6714,9704)
                *PrintableOrigin:=PAIR(150,110)
        }
}
```

FIG. 8A

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing" xmlns:wsd="http://schemas.xmlsoap.org/ws/2005/04/discovery">
  <soap:Header>
    <wsa:To>urn:schemas-xmlsoap-org:ws:2005:04:discovery</wsa:To>
    <wsa:Action>http://schemas.xmlsoap.org/ws/2005/04/discovery/Probe</wsa:Action>
    <wsa:MessageID>urn:uuid:a0c1614f-40a5-42ea-9bb1-2a53f958babd</wsa:MessageID>
  </soap:Header>
  <soap:Body>
    <wsd:Probe/>
  </soap:Body>
</soap:Envelope>
```

FIG. 8B

```
<?xml version='1.0' encoding='UTF-8'?>
<soap:Envelope xmlns:soap='http://www.w3.org/2003/05/soap-envelope' xmlns:xsd='http://www.w3.org/2001/XMLSchema' xmlns:xsi='http://www.w3.org/2001/XMLSchema-instance'>
  <soap:Header xmlns:wsa='http://schemas.xmlsoap.org/ws/2004/08/addressing' xmlns:wsd='http://schemas.xmlsoap.org/ws/2005/04/discovery'>
    <wsa:Action>http://schemas.xmlsoap.org/ws/2005/04/discovery/ProbeMatches</wsa:Action>
    <wsa:MessageID>urn:uuid:00000c7f-0093-02cd-0111-000000001f57</wsa:MessageID>
    <wsa:RelatesTo>urn:uuid:a0c1614f-40a5-42ea-9bb1-2a53f958babd</wsa:RelatesTo>
    <wsa:To>http://schemas.xmlsoap.org/ws/2004/08/addressing/role/anonymous</wsa:To>
    <wsd:AppSequence InstanceId='9' MessageNumber='27'/>
  </soap:Header>
  <soap:Body xmlns:wsd='http://schemas.xmlsoap.org/ws/2005/04/discovery'>
    <wsd:ProbeMatches>
      <wsd:ProbeMatch xmlns:wsa='http://schemas.xmlsoap.org/ws/2004/08/addressing'>
        <wsa:EndpointReference>
          <wsa:Address>urn:uuid:6d4ff0ce-6b11-11d8-8020-0000854f8b5e</wsa:Address>
        </wsa:EndpointReference>
        <wsd:Types xmlns:ns1='http://schemas.xmlsoap.org/ws/2006/02/devprof' xmlns:ns2='http://schemas.microsoht.com/doors/2006/08/wdp/print' xmlns:ns3='http://www.ihv.com/ns/active/wsd'>ns1:Device ns2:PrintDeviceType ns3:MFP</wsd:Types>
        <wsd:XAddrs>http://192.168.0.2/wsd/mex</wsd:XAddrs>
        <wsd:MetadataVersion>1</wsd:MetadataVersion>
      </wsd:ProbeMatch>
    </wsd:ProbeMatches>
  </soap:Body>
</soap:Envelope>
```

F I G. 9A

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing" >
  <soap:Header>
    <wsa:To>urn:uuid:6d4ff0ce-6b11-11d8-8020-0000854f8b5e</wsa:To>
    <wsa:Action>http://schemas.xmlsoap.org/ws/2004/09/transfer/Get</wsa:Action>
    <wsa:MessageID>urn:uuid:8dcf9b58-0a35-47ba-a73f-cca5d7f95d3e</wsa:MessageID>
    <wsa:ReplyTo>
      <wsa:Address>http://schemas.xmlsoap.org/ws/2004/08/addressing/role/anonymous</wsa:Address>
    </wsa:ReplyTo>
    <wsa:From>
      <wsa:Address>urn:uuid:f7acdc70-b9df-4319-a6c2-2838fd67e7a5</wsa:Address>
    </wsa:From>
  </soap:Header>
  <soap:Body>
</soap:Envelope>
```

FIG. 9B

```xml
<?xml version='1.0' encoding='UTF-8'?>
<soap:Envelope xmlns:mex='http://schemas.xmlsoap.org/ws/2004/09/mex' xmlns:nprt='http://
schemas.microsoht.com/doors/2006/08/wdp/print' xmlns:pnpx='http://schemas.microsoht.com/doors/
pnpx/2005/10' xmlns:soap='http://www.w3.org/2003/05/soap-envelope' xmlns:wsa='http://
schemas.xmlsoap.org/ws/2004/08/addressing' xmlns:wsdp='http://schemas.xmlsoap.org/ws/2006/02/
devprof' xmlns:xsd='http://www.w3.org/2001/XMLSchema'xmlns:xsi='http://www.w3.org/2001/
XMLSchema-instance'>
 <soap:Header>
  <wsa:Action>http://schemas.xmlsoap.org/ws/2004/09/transfer/GetResponse</wsa:Action>
  <wsa:MessageID>urn:uuid:000020ef-0083-0226-017c-000000001f27</wsa:MessageID>
  <wsa:RelatesTo>urn:uuid:8dcf9b58-0a35-47ba-a73f-cca5d7f95d3e</wsa:RelatesTo>
  <wsa:To>http://schemas.xmlsoap.org/ws/2004/08/addressing/role/anonymous</wsa:To>
 </soap:Header>
 <soap:Body>
  <mex:Metadata>
   <mex:MetadataSection Dialect='http://schemas.xmlsoap.org/ws/2006/02/devprof/ThisDevice'>
    <wsdp:ThisDevice>
     <wsdp:FriendlyName xml:lang='ja'>PrinterA</wsdp:FriendlyName>
     <wsdp:FirmwareVersion>87.15</wsdp:FirmwareVersion>
     <wsdp:SerialNumber>###0001</wsdp:SerialNumber>
    </wsdp:ThisDevice>
   </mex:MetadataSection>
   <mex:MetadataSection Dialect='http://schemas.xmlsoap.org/ws/2006/02/devprof/ThisModel'>
    <wsdp:ThisModel>
     <wsdp:Manufacturer xml:lang='ja'>IHV</wsdp:Manufacturer>
     <wsdp:ModelName xml:lang='ja'>PrinterA</wsdp:ModelName>
     <wsdp:PresentationUrl>http://192.168.0.2/</wsdp:PresentationUrl>
     <pnpx:DeviceCategory>MFP</pnpx:DeviceCategory>
    </wsdp:ThisModel>
   </mex:MetadataSection>
   <mex:MetadataSection Dialect='http://schemas.xmlsoap.org/ws/2006/02/devprof/Relationship'>
    <wsdp:Relationship Type='http://schemas.xmlsoap.org/ws/2006/02/devprof/host'>
     <wsdp:Hosted>
      <wsa:EndpointReference>
       <wsa:Address>http://192.168.0.2/wsd/print</wsa:Address>
      </wsa:EndpointReference>
      <wsdp:Types>nprt:PrinterServiceType</wsdp:Types>
      <wsdp:ServiceId>uri:2cf10542-ba40-33aa-687e-873db0f1b698</wsdp:ServiceId>
      <pnpx:CompatibleId>http://schemas.microsoht.com/doors/2006/08/wdp/print/
PrinterServiceType</pnpx:CompatibleId>
     </wsdp:Hosted>
    </wsdp:Relationship>
   </mex:MetadataSection>
  </mex:Metadata>
 </soap:Body>
</soap:Envelope>
```

FIG. 10A

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing" xmlns:pri="http://schemas.microsoht.com/doors/2006/08/wdp/print" >
    <soap:Header>
        <wsa:To>http://172.24.192.245/wsd/print</wsa:To>
        <wsa:Action>http://schemas.microsoht.com/doors/2006/08/wdp/print/GetPrinterElements</wsa:Action>
        <wsa:MessageID>urn:uuid:65a81556-13a6-4c1b-a49f-8933c4f2d5d6</wsa:MessageID>
        <wsa:ReplyTo>
            <wsa:Address>http://schemas.xmlsoap.org/ws/2004/08/addressing/role/anonymous</wsa:Address>
        </wsa:ReplyTo>
        <wsa:From>
            <wsa:Address>urn:uuid:86bcd007-1582-4484-8da6-83637d09828f</wsa:Address>
        </wsa:From>
    </soap:Header>
    <soap:Body>
        <pri:GetPrinterElementsRequest>
            <pri:RequestedElements>
                <pri:Name>pri:PrinterDescription</pri:Name>
            </pri:RequestedElements>
        </pri:GetPrinterElementsRequest>
    </soap:Body>
</soap:Envelope>
```

F I G. 10B

```
<?xml version='1.0' encoding='UTF-8'?>
<soap:Envelope xmlns:cex='http://www.camon.com/ns/active/wsd' xmlns:pri='http://schemas.microsoht.com/doors/
2006/08/wdp/print' xmlns:soap='http://www.w3.org/2003/05/soap-envelope' xmlns:wsa='http://schemas.xmlsoap.org/
ws/2004/08/addressing' xmlns:wsdp='http://schemas.xmlsoap.org/ws/2006/02/devprof' xmlns:xsd='http://www.w3.org/
2001/XMLSchema' xmlns:xsi='http://www.w3.org/2001/XMLSchema-instance'>
 <soap:Header>
  <wsa:Action>http://schemas.microsoht.com/doors/2006/08/wdp/print/GetPrinterElementsResponse</wsa:Action>
  <wsa:MessageID>urn:uuid:00001b3e-02e6-0259-03a1-000000000eba</wsa:MessageID>
  <wsa:RelatesTo>urn:uuid:65a81556-13a6-4c1b-a49f-8933c4f2d5d6</wsa:RelatesTo>
  <wsa:To>http://schemas.xmlsoap.org/ws/2004/08/addressing/role/anonymous</wsa:To>
 </soap:Header>
 <soap:Body>
  <pri:GetPrinterElementsResponse>
   <pri:PrinterElements>
    <pri:ElementData Name='pri:PrinterDescription' Valid='true' xmlns:pri='http://schemas.microsoht.com/doors/
2006/08/wdp/print' xmlns:wprtv11='http://schemas.microsoht.com/doors/2010/06/wdp/printv11'>
     <pri:PrinterDescription>
      <pri:ColorSupported>true</pri:ColorSupported>
      <pri:DeviceId>
        MFG:IHV;MDL:PRINTERA;CLS:PRINTER;DES:Printer;CID:IHV_XPS;CMD;XPS,PCL,1284.4(JOB=0x10
ADMIN=0x20 RSC=0x30),1284.4-2000;
      </pri:DeviceId>
      <pri:MultipleDocument.JobsSupported>false</pri:MultipleDocument.JobsSupported>
      <pri:PagesPerMinute>35</pri:PagesPerMinute>
      <pri:PagesPerMinuteColor>30</pri:PagesPerMinuteColor>
      <pri:PrinterName xml:lang='ja'>PrinterA</pri:PrinterName>
      <pri:PrinterLocation xml:lang='ja'/>
       <wprtv11:SupportsWSPrintv11>true</wprtv11:SupportsWSPrintv11>
       <wprtv11:DeviceModelId>3471C3FC-9E5C-4C4A-BCA9-98BEAAE05664</wprtv11:DeviceModelId>
     </pri:PrinterDescription>
    </pri:ElementData>
   </pri:PrinterElements>
  </pri:GetPrinterElementsResponse>
 </soap:Body>
</soap:Envelope>
```

```xml
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing" xmlns:pri="http://schemas.microsoht.com/doors/2006/08/wdp/print" xmlns:wprt11="http://schemas.microsoht.com/doors/2010/06/wdp/printv11">
  <soap:Header>
    <wsa:To>http://192.168.0.2/wsd/print</wsa:To>
    <wsa:Action>http://schemas.microsoht.com/doors/2006/08/wdp/print/GetPrinterElements</wsa:Action>
    <wsa:MessageID>urn:uuid:2d03ccf1-9b8d-41b9-a70c-fdced72efd4e</wsa:MessageID>
    <wsa:ReplyTo>
      <wsa:Address>http://schemas.xmlsoap.org/ws/2004/08/addressing/role/anonymous</wsa:Address>
    </wsa:ReplyTo>
    <wsa:From>
      <wsa:Address>urn:uuid:86bcd007-1582-4484-8da6-83637d09828f</wsa:Address>
    </wsa:From>
  </soap:Header>
  <soap:Body>
    <pri:GetPrinterElementsRequest>
      <pri:RequestedElements>
        <pri:Name ModelName="Inbox XPS Model">wprt11:DriverConfiguration</pri:Name>    ~1101
      </pri:RequestedElements>
    </pri:GetPrinterElementsRequest>
  </soap:Body>
</soap:Envelope>
```

F I G. 11B

```
<?xml version='1.0' encoding='UTF-8'?>
<soap:Envelope xmlns:cex='http://www.canon.com/ns/active/wsd' xmlns:pri='http://schemas.microsoht.com/doors/2006/08/wdp/
print' xmlns:soap='http://www.w3.org/2003/05/soap-envelope' xmlns:wsa='http://schemas.xmlsoap.org/ws/2004/08/addressing'
xmlns:wsdp='http://schemas.xmlsoap.org/ws/2006/02/devprof' xmlns:xsd='http://www.w3.org/2001/XMLSchema' xmlns:xsi='http://
www.w3.org/2001/XMLSchema-instance'>
 <soap:Header>
  <wsa:Action>http://schemas.microsoht.com/doors/2006/08/wdp/print/GetPrinterElementsResponse</wsa:Action>
  <wsa:MessageID>urn:uuid:000005c5-01a3-0103-0128-000000000c0f</wsa:MessageID>
  <wsa:RelatesTo>urn:uuid:2d03ccf1-9b8d-41b9-a70c-fdced72efd4e</wsa:RelatesTo>
  <wsa:To>http://schemas.xmlsoap.org/ws/2004/08/addressing/role/anonymous</wsa:To>
 </soap:Header>
 <soap:Body>
  <pri:GetPrinterElementsResponse>
   <pri:PrinterElements>
    <pri:ElementData Name='pri:PrinterDescriotion'Valid='true' xmlns:pri='http://schemas.microsoht.com/doors/2006/08/wdp/
print' xmlns:wprtv11='http://schemas.microsoht.com/doors/2010/06/wdp/printv11'>
     <wprtv11:DriverConfiguration>
      <wprtv11:GPDCnfigFile xml:space='preserve'>
*Feature:PaperSize
{
       *Option:A3
       {
              *rcNameID:=RCID_DMPAPER_SYSTEM_NAME
              *PrintableArea:PAIR(6774,9680)
              *PrintableOrigin:PAIR(120,120)
       }
}
      </wprtv11:GPDCnfigFile>
     </wprtv11:DriverConfiguration>
    </pri:ElementData>
   </pri:PrinterElements>
  </pri:GetPrinterElementsResponse>
 </soap:Body>
</soap:Envelope>
```

~1102 (bracketing the DriverConfiguration block)

F I G. 12
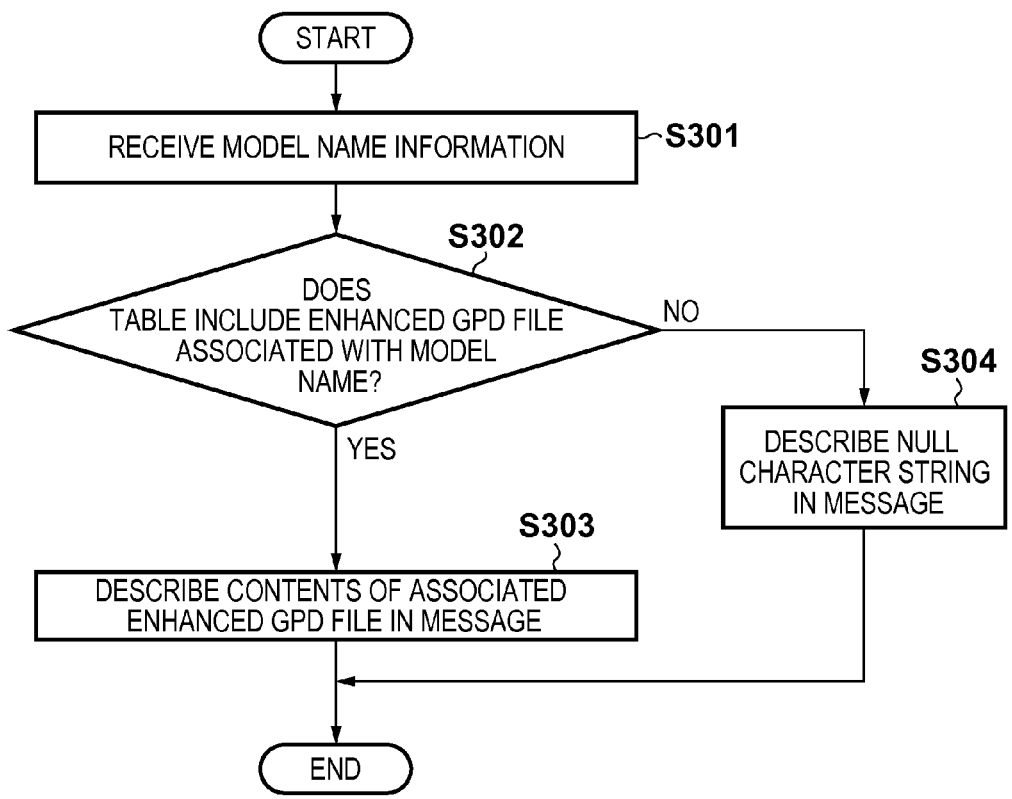

F I G. 13

| Model Name | Enhanced GPD File |
|---|---|
| Inbox XPS Model | XPSEnhance.GPD |
| Outbox PCL Model | PCLEnhance.GPD |
| (other) | (none) |
|  |  |

F I G. 14

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing" xmlns:pri="http://schemas.microsoht.com/doors/2006/08/wdp/print/GetPrinterElements" xmlns:wprt11="http://schemas.microsoht.com/doors/2010/06/wdp/printiv11">
 <soap:Header>
  <wsa:To>http://192.168.0.2/wsd/print</wsa:To>
  <wsa:Action>http://schemas.microsoht.com/doors/2006/08/wdp/print/GetPrinterElements</wsa:Action>
  <wsa:MessageID>urn:uuid:2d03ccf1-9b8d-41b9-a70c-fdced72efd4e</wsa:MessageID>
  <wsa:ReplyTo>
   <wsa:Address>http://schemas.xmlsoap.org/ws/2004/08/addressing/role/anonymous</wsa:Address>
  </wsa:ReplyTo>
  <wsa:From>
   <wsa:Address>urn:uuid:86bcd007-1582-4484-8da6-83637d09828f</wsa:Address>
  </wsa:From>
 </soap:Header>
 <soap:Body>
  <pri:GetPrinterElementsRequest>
   <pri:RequestedElements>
1401 ——<pri:Name ModelName="Inbox XPS Model" DriverVer="1.1" OSVer="2.0">wprt11:DriverConfiguration</pri:Name>
   </pri:RequestedElements>
  </pri:GetPrinterElementsRequest>
 </soap:Body>
</soap:Envelope>
```

FIG. 15

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/
addressing" xmlns:pri="http://schemas.microsoht.com/doors/2006/08/wdp/print" xmlns:wprt11="http://schemas.microsoht.com/
doors/2010/06/wdp/printiv11">
 <soap:Header>
  <wsa:To>http://192.168.0.2/wsd/print</wsa:To>
  <wsa:Action>http://schemas.microsoht.com/doors/2006/08/wdp/print/GetPrinterElements</wsa:Action>
  <wsa:MessageID>urn:uuid:2d03ccf1-9b8d-41b9-a70c-fdced72efd4e</wsa:MessageID>
  <wsa:ReplyTo>
   <wsa:Address>http://schemas.xmlsoap.org/ws/2004/08/addressing/role/anonymous</wsa:Address>
  </wsa:ReplyTo>
  <wsa:From>
   <wsa:Address>urn:uuid:86bcd007-1582-4484-8da6-83637d09828f</wsa:Address>
  </wsa:From>
 </soap:Header>
 <soap:Body>
  <pri:GetPrinterElementsRequest>
   <pri:RequestedElements>
    <pri:Name ModelName="Inbox XPS Model" DriverVer="1.1" OSVer="2.0"
       Locale="ja-JP">wprt11:DriverConfiguration</pri:Name>
   </pri:RequestedElements>
  </pri:GetPrinterElementsRequest>
 </soap:Body>
</soap:Envelope>
```

```
*Feature:PaperType
{
        *Option:JapanesePaper
        {
                *Name:"和紙 (64~105g/m²)"
        }
}
```

PRINTING SYSTEM, CONTROL METHOD FOR INFORMATION PROCESSING APPARATUS, AND NON-TRANSITORY COMPUTER-READABLE MEDIUM FOR INSTALLING A PRINTER DRIVER

BACKGROUND OF THE INVENTION

1. Field of the Invention

The present invention relates to a printing system, a control method for an information processing apparatus, and a non-transitory computer-readable medium.

2. Description of the Related Art

In recent years, a mutual printer driver that can be used for any type of printer, or a so-called general-purpose printer driver, has been researched and developed. However, a general-purpose printer driver is problematic in that, as it is configured to make usable only functions common to discrete printers, the printers' respective unique functions cannot be used.

In view of this, a technique has been proposed to obtain configuration files including information of printer functions by accessing, from an information processing apparatus, storages of various apparatuses such as a printer and a server in a network, so as to expand the functions of a printer driver (for example, the specification of U.S. Patent Application Publication No. 2012/0147414). The use of such a technique makes usable the printers' respective unique functions, even with a general-purpose printer driver.

According to the specification of U.S. Patent Application Publication No. 2012/0147414, the same configuration files are obtained from the storages at any time. Oftentimes, a printer is configured to be capable of processing a plurality of PDLs (print commands); in this case, not only multiple types of printer drivers, but also multiple types of general-purpose printer drivers are developed and provided for each type of PDL.

Therefore, if an information processing apparatus is installed with multiple types of general-purpose printer drivers that differ from one another in specifications, the information processing apparatus may not cause the printer to function due to incompatibility between configuration files and the general-purpose printer drivers even after the configuration files have been read.

In view of the above, the present invention realizes expansion and operation of functions through obtainment of configuration files compatible with a plurality of printer drivers that differ from one another in specifications.

SUMMARY OF THE INVENTION

According to one aspect of the present invention, there is provided a printing system comprising a printing apparatus and an information processing apparatus, the information processing apparatus including: a first obtaining unit configured to obtain hardware information of the printing apparatus at the time of installation of a printer driver associated with the printing apparatus; a deciding unit configured to decide on a printer driver to be installed from among a plurality of printer drivers that are associated with the printing apparatus and differ from one another in specifications based on the hardware information; a second obtaining unit configured to transmit to the printing apparatus attribute information of the printer driver that has been decided on, and to obtain as a response thereto a configuration file for expanding functions of the printer driver that has been decided on; and a functional expansion unit configured to install the printer driver that has been decided on, and further to perform functional expansion for the printer driver using the obtained configuration file, and the printing apparatus including a providing unit configured to provide the information processing apparatus with the configuration file compatible with the printer driver that has been decided on based on the attribute information received from the information processing apparatus.

According to another aspect of the present invention, there is provided a control method for an information processing apparatus, comprising the steps of: obtaining hardware information of a printing apparatus at the time of installation of a printer driver associated with the printing apparatus; deciding on a printer driver to be installed from among a plurality of printer drivers that are associated with the printing apparatus and differ from one another in specifications based on the hardware information; transmitting to the printing apparatus attribute information of the printer driver that has been decided on, and obtaining as a response thereto a configuration file for expanding functions of the printer driver that has been decided on; and installing the printer driver that has been decided on, and further performing functional expansion for the printer driver using the obtained configuration file.

According to another aspect of the present invention, there is a provided a non-transitory computer-readable medium storing a program that causes a computer to execute the steps of: obtaining hardware information of a printing apparatus at the time of installation of a printer driver associated with the printing apparatus; deciding on a printer driver to be installed from among a plurality of printer drivers that are associated with the printing apparatus and differ from one another in specifications based on the hardware information; transmitting to the printing apparatus attribute information of the printer driver that has been decided on, and obtaining as a response thereto a configuration file for expanding functions of the printer driver that has been decided on; and installing the printer driver that has been decided on, and further performing functional expansion for the printer driver using the obtained configuration file.

With the present invention, even if an information processing apparatus is installed with a plurality of printer drivers that differ from one another in specifications, the respective functions of the printer drivers can be appropriately expanded.

Further features of the present invention will become apparent from the following description of exemplary embodiments (with reference to the attached drawings).

BRIEF DESCRIPTION OF THE DRAWINGS

FIG. 6 shows an example of a GPD file and an enhanced GPD file.

FIGS. 8A and 8B show examples of a Probe message and a ProbeMatch message.

FIGS. 9A and 9B show examples of a MetaData obtainment message.

FIGS. 10A and 10B show examples of a PrinterDescription obtainment message.

FIGS. 11A and 11B show examples of a DriverConfiguration obtainment message.

FIG. 12 is a flowchart of generation processing for a DriverConfiguration obtainment response message.

FIG. 13 shows an example of a table including pairs of a model name and an enhanced GPD file.

FIG. 14 shows an example of a DriverConfiguration obtainment message according to a second embodiment.

FIG. 15 shows an example of a DriverConfiguration obtainment message according to a third embodiment.

FIG. 16 shows an example of an enhanced GPD file.

DESCRIPTION OF THE EMBODIMENTS

First Embodiment

The following describes a first embodiment of the present invention with reference to the drawings.

[System Configuration]

Figure 1:
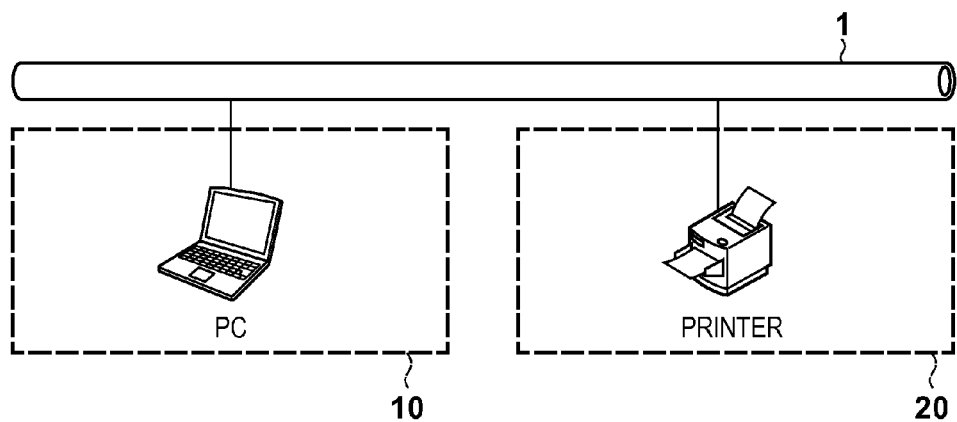
FIG. 1 shows an example of a configuration of a printing system.

FIG. 1 shows an example of a configuration of a printing system according to the present invention. The present printing system includes a PC 10 and a printer 20, which are an information processing apparatus and an image forming apparatus, respectively. The PC 10 and the printer 20 are connected via a LAN 1 such that they can communicate with each other. The LAN 1 supports Ethernet (registered trademark) communication methods. The PC 10 and the printer 20 may be connected via a wired LAN, Bluetooth (registered trademark), a USB, and other forms of connection. Furthermore, while FIG. 1 illustrates one PC and one printer, a plurality of PCs and a plurality of printers may be included.

Figure 2:
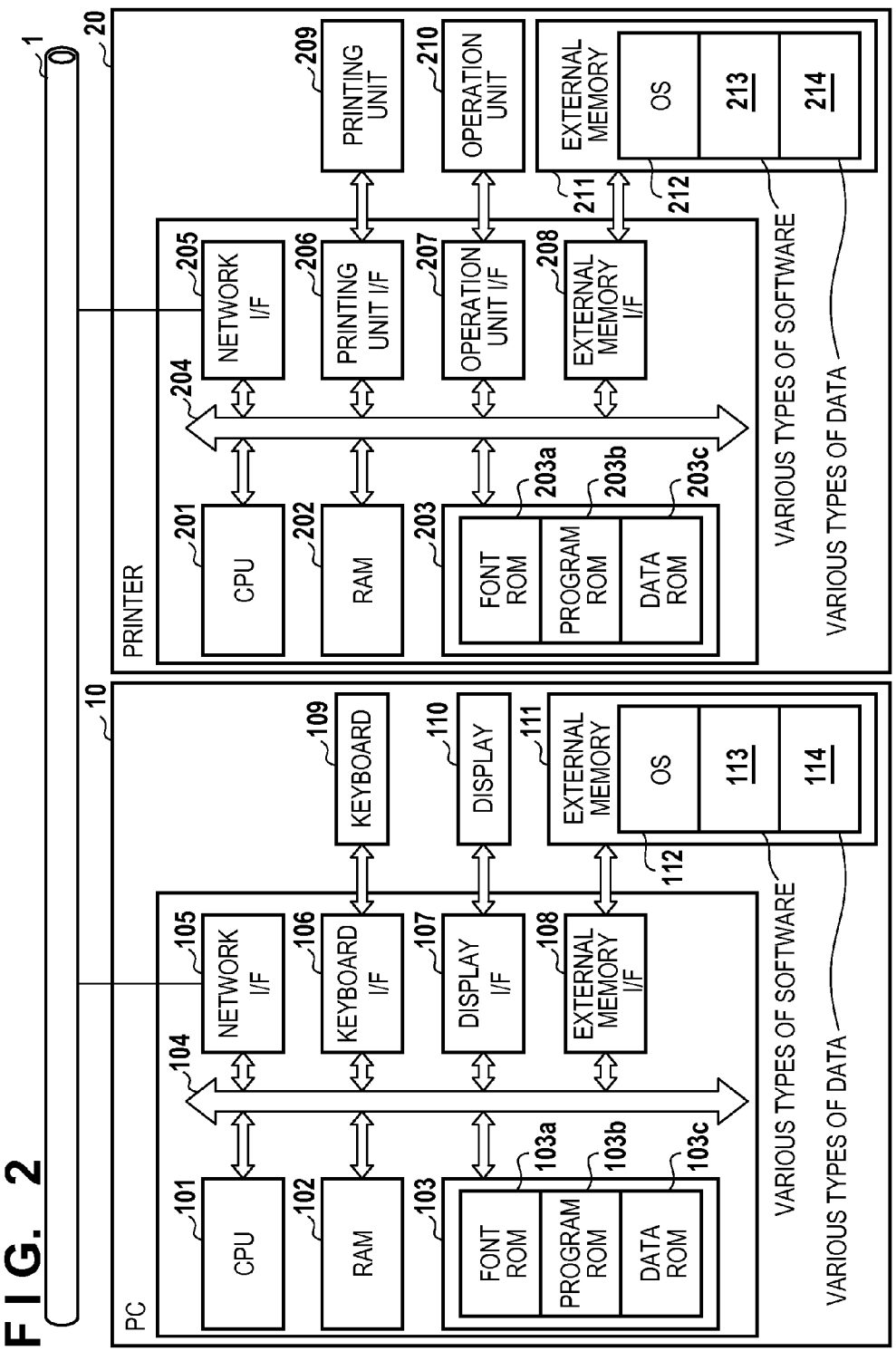
FIG. 2 shows an example of hardware configurations of apparatuses included in the printing system.

FIG. 2 is a block diagram showing hardware configurations according to the present embodiment. First, a hardware configuration of the PC 10 will be described. A CPU 101 performs overall control of devices connected to a system bus 104 by reading and executing programs stored in a RAM 102. The RAM 102 functions as a main memory, a working area, and the like for the CPU 101. A ROM 103 stores various types of programs and data. The ROM 103 is segmented into a font ROM 103a for storing various fonts, a program ROM 103b for storing a boot program, BIOS, and the like, and a data ROM 103c for storing various types of data.

A network I/F 105 is connected to the LAN 1 and executes processing for communication with external apparatuses. A keyboard controller I/F 106 controls key input from a keyboard 109 and a pointing device (for example, a mouse), which is not shown. A display I/F 107 controls display processing for a display 110. An external memory I/F 108 controls access to, for example, an external memory 111 such as a hard disk (HD). The external memory 111 functions as a storage medium for storing an operating system (hereinafter, OS) 112, various types of software 113 that bear the functions of the printing system of the present invention, and various types of data 114 such as user files and editing files. While the OS 112 is not limited to a particular type, it will be assumed that Microsoft Windows (registered trademark) is used thereas in the present embodiment.

Next, a hardware configuration of the printer 20 will be described. A CPU 201 performs overall control of devices connected to a system bus 204 by reading and executing programs stored in a RAM 202. The RAM 202 functions as a main memory, a working area, and the like for the CPU 201, and is also used as output information deployment area and an environmental data storage area. The RAM 202 also has an NVRAM (non-volatile RAM) area, and is configured to enable expansion of memory capacity using an optional RAM connected to an expansion port (not shown).

A ROM 203 includes a font ROM 203a for storing various fonts, a program ROM 203b for storing control programs executed by the CPU 201 and the like, and a data ROM 203c for storing various types of data. A network I/F 205 is connected to the LAN 1 and executes processing for communication with external apparatuses. A printing unit I/F 206 controls an interface for a printing unit 209 that serves as a printer engine. An operation unit 210, which is controlled by an operation unit I/F 207, is provided with an operation panel that accepts user operations, and the operation panel is provided with switches, LED indicators, and the like (not shown) for operations.

An external memory I/F 208 controls access to, for example, an external memory 211 such as a hard disk (HD). The external memory 211 functions as a storage medium for storing a device operating system 212, various types of software 213 that bear the functions of the printing system of the present invention, and various types of data 214 such as enhanced GPD files and tables.

A GPD (Generic Printer Description) file is a data file (configuration file) that defines print configurations of a printer driver. An enhanced GPD file is a data file that is used in expanding the definition of print configurations after installing a printer driver.

The CPU 201 can execute processing for communication with the PC 10 via the network I/F 205, and receives PDL (Page Description Language) data transmitted from the PC 10. The CPU 201 can output an image signal obtained by converting printing data to the printing unit 209 via the printing unit I/F 206 based on, for example, the control programs stored in the program ROM 203b of the ROM 203.

[Software Configuration]

Figure 3:
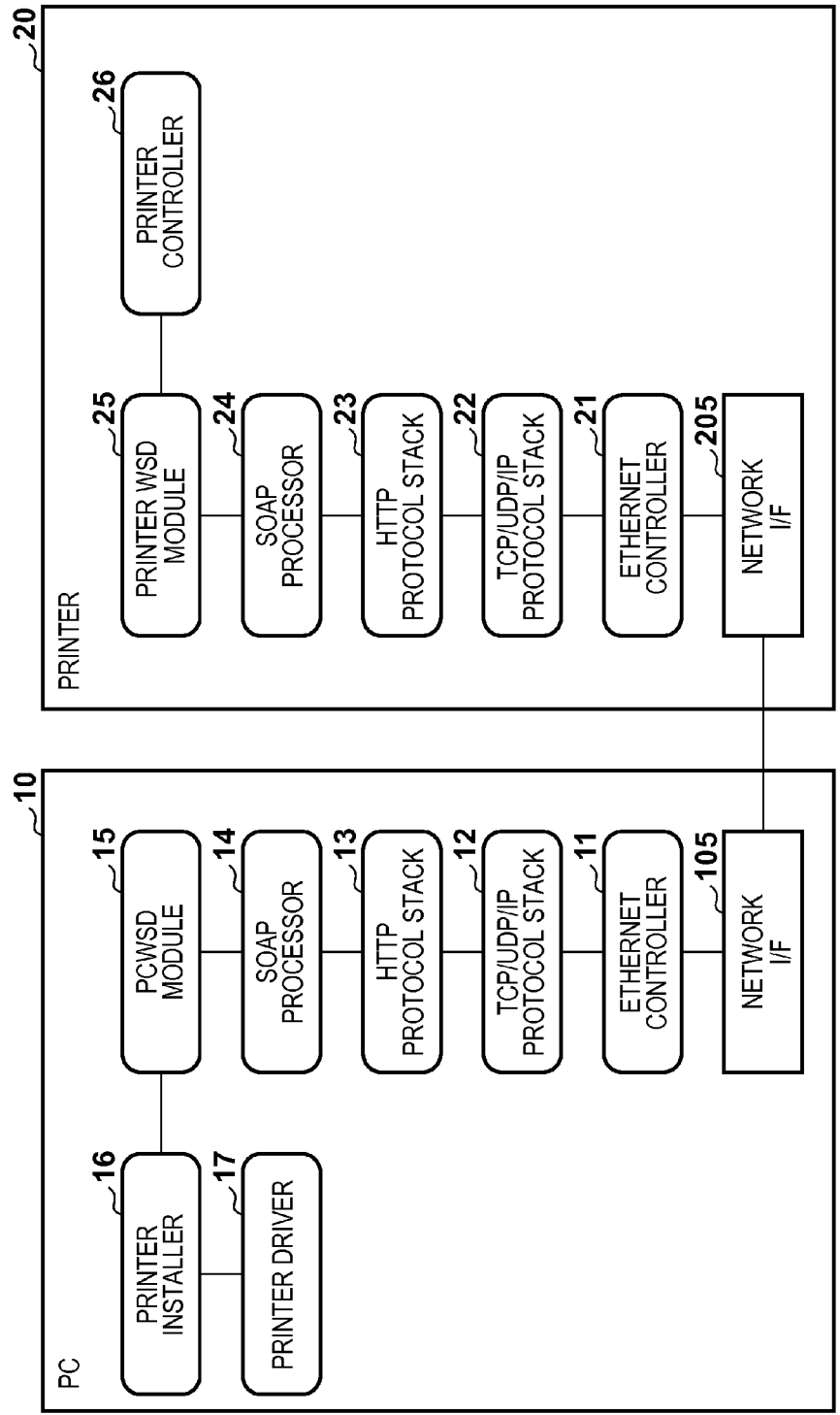
FIG. 3 shows an example of software configurations of the apparatuses included in the printing system.

FIG. 3 shows configurations of software of the PC 10 and the printer 20 for executing processing of the present printing system. First, a software configuration of the PC 10 will be described. Software components (11 to 17) of the PC 10 are stored in the external memory 111, and are loaded into the RAM 102 to be executed by the CPU 101.

An Ethernet controller 11 controls Ethernet (registered trademark) communication processing via the network I/F 105. A TCP/UDP/IP protocol stack 12 arranged in a layer thereabove controls TCP/UDP/IP protocol communication. An HTTP protocol stack 13 arranged in a layer thereabove controls HTTP (Hypertext Transfer Protocol) communication processing. A SOAP processor 14 controls SOAP (Simple Object Model Protocol) communication processing. SOAP is a communication protocol used in web service techniques for calling up, from apparatuses, processing and data of the apparatuses.

A PC WSD module 15 controls WSD (Web Services on Devices) communication processing via the SOAP processor 14. WSD is one type of web service techniques whose specifications have been formulated by Microsoft Corporation, etc.

A printer installer 16 is a program for causing the OS 112 to search for apparatuses via WSD communication and install a printer driver 17. The printer installer 16 also performs functional expansion by merging an enhanced GPD file included in attribute information with a GPD file of the printer driver 17. As will be explained later, the description of the present embodiment relates to an example in which there are two types of printer drivers 17 that could possibly be installed, and it will be assumed that which one of the printer drivers is targeted for functional expansion is indefinite.

Next, a software configuration of the printer 20 will be described. Software components (21 to 26) of the printer 20 are stored in the external memory 211, and are loaded into the RAM 202 to be executed by the CPU 201. An Ethernet controller 21 controls Ethernet (registered trademark) communication processing via the network I/F 205. A TCP/UDP/IP protocol stack 22 arranged in a layer thereabove controls TCP/UDP/IP protocol communication. An HTTP protocol stack 23 arranged in a layer thereabove controls HTTP communication processing, and a SOAP processor 24 controls SOAP communication processing.

A printer WSD module 25 controls WSD communication processing via the SOAP processor 24. The printer WSD module 25 is controlled by a printer controller 26.

[Installation of Printer Driver]

Figure 4:
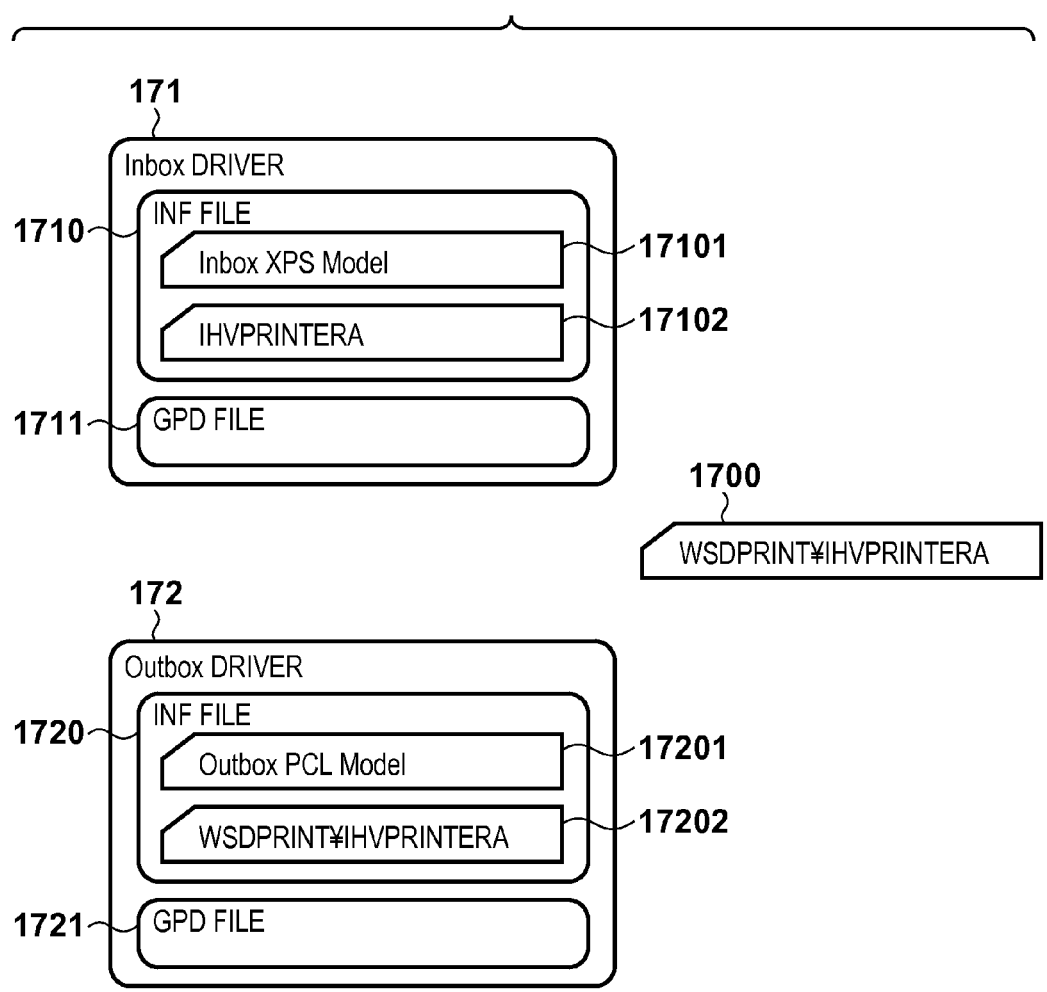
FIG. 4 shows a relationship among an Inbox driver, an Outbox driver, and hardware IDs.

With reference to FIG. 4, the following describes the flow in which the printer installer 16 installs one of the two types of printer drivers based on attribute information of an apparatus. An Inbox driver 171 is a printer driver that is pre-installed in the OS. On the other hand, an Outbox driver 172 is a printer driver that is additionally installed in the OS in a post hoc manner.

In the present embodiment, the Inbox driver 171 is pre-stored in the external memory 111 managed by the OS 112. On the other hand, the Outbox driver 172 is obtained by a user through an external medium, such as a CD-ROM, and the Internet, and is installed by being stored into the external memory 111 managed by the OS 112 in a post hoc manner. It will be assumed that the Inbox driver 171 and the Outbox driver 172 are both configured as general-purpose printer drivers.

The Inbox driver 171 and the Outbox driver 172 respectively include INF files 1710 and 1720 describing information for installation, and respectively include GPD files 1711 and 1721 defining the functions as printer drivers. The INF file 1710 describes information of a model name 17101 and a hardware ID 17102, and the INF file 1720 describes information of a model name 17201 and a hardware ID 17202. A hardware ID is hardware information that serves as an identifier for associating an apparatus and a driver. While a model name (name information) is used as identification information for identifying a printer driver in the present embodiment, the identification information is not limited to the model name and may be, for example, an identifier such as a model ID.

The printer installer 16 decides whether or not to install a driver based on whether or not a hardware ID 1700 included in attribute information obtained from the printer 20 matches a hardware ID described in an INF file. In the case of the example shown in FIG. 4, the hardware ID 1700 obtained from the printer 20 is a character string value "WSDPRINT¥IHVPRINTERA".

The hardware ID 17202 of the Outbox driver 172 is a value "WSDPRINT¥IHVPRINTERA", that is to say, completely matches the hardware ID 1700. The hardware ID 17102 of the Inbox driver 171 is "IHVPRINTERA", that is to say, matches a part of the hardware ID 1700 following "¥".

In the present embodiment, it will be assumed that the printer installer 16 regards hardware IDs with completely matching character string values, as well as hardware IDs with partially matching character string values, as matching. It will be assumed that, if hardware IDs match, a printer driver and hardware comply with each other, that is to say, are compatible with each other.

[Selection Processing]

Figure 5:
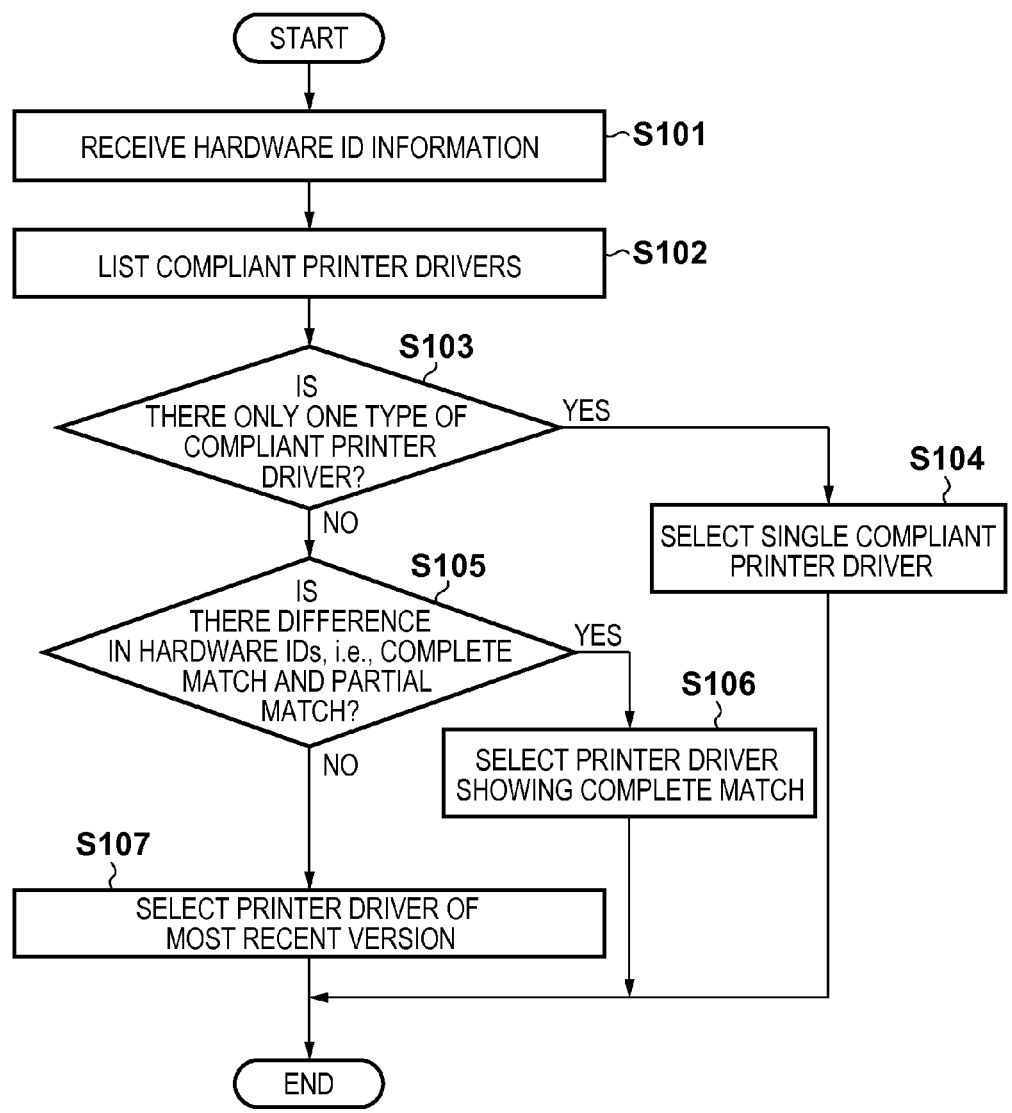
FIG. 5 is a flowchart of processing for deciding on a printer driver to be installed.

FIG. 5 is a flowchart of processing in which the printer installer 16 of the PC 10 selects one printer driver to be installed from among multiple types of printer drivers. The printer installer 16 obtains the hardware ID 1700 of the printer 20 via the PC WSD module 15 (step S101). Then, the printer installer 16 lists printer drivers (step S102) that are compatible (that is to say, compliant).

In step S103, the printer installer 16 judges whether or not there is one type of compliant printer driver among the listed printer drivers. If there is only one type of compliant printer driver (YES of step S103), the printer installer 16 selects this one type of compliant printer driver as a printer driver to be installed (step S104). If there is only one type of compliant printer driver, it indicates that this printer driver is the Inbox driver 171 and the Outbox driver 172 has not been installed by the user. Thereafter, the present processing flow is ended.

If there are multiple types of compliant printer drivers (NO of step S103), processing proceeds to step S105. In step S105, the printer installer 16 refers to the hardware IDs described in the INF files of the printer drivers, and judges their statuses of match with the hardware ID 1700 (complete match or partial match). If there is a difference in the printer drivers, i.e., one printer driver shows complete match and another printer driver shows partial match (YES of step S105), the printer installer 16 selects a printer driver showing complete match as a printer driver to be installed (step S106). If there is no difference in the statuses of match (NO of step S105), the printer installer 16 selects a printer driver of the most recent version in step S107. In the present embodiment, the Outbox driver 172 with a completely matching hardware ID is selected.

[File Structure]

FIG. 6 shows examples of a GPD file and an enhanced GPD file. The GPD file 1711 is an example of a file structure of the Inbox driver 171. The GPD file 1711 defines information related to two selectable sheet sizes, "A4" and "LETTER".

On the other hand, the GPD file 1721 is an example of a file structure of the Outbox driver 172. While the GPD file 1721 similarly defines "A4" and "LETTER", it designates different numerical values as sizes of printing areas from the GPD file 1711. This is because the Inbox driver 171 and the Outbox driver 172 differ from each other in PDL specifications.

An enhanced GPD file 1712 is an example of an enhanced GPD file for expanding the functions of the Inbox driver 171. The enhanced GPD file 1712 defines information indicating that "A3" can be newly designated as a sheet size.

An enhanced GPD file 1722 is an example of an enhanced GPD file for expanding the functions of the Outbox driver 172, and defines information indicating that "A3" can be designated similarly to the enhanced GPD file 1712. Again, due to the difference in the PDL specifications, the enhanced GPD file 1712 and the enhanced GPD file 1722 show different sizes of printing areas for the designated "A3" sheet.

Therefore, in order to perform functional expansion suited for individual PDL specifications, it is necessary to provide the different enhanced GPD files 1712 and 1722 and use them distinctively from each other depending on the type of a general-purpose printer driver to be installed.

[Processing Sequence]

Figure 7:
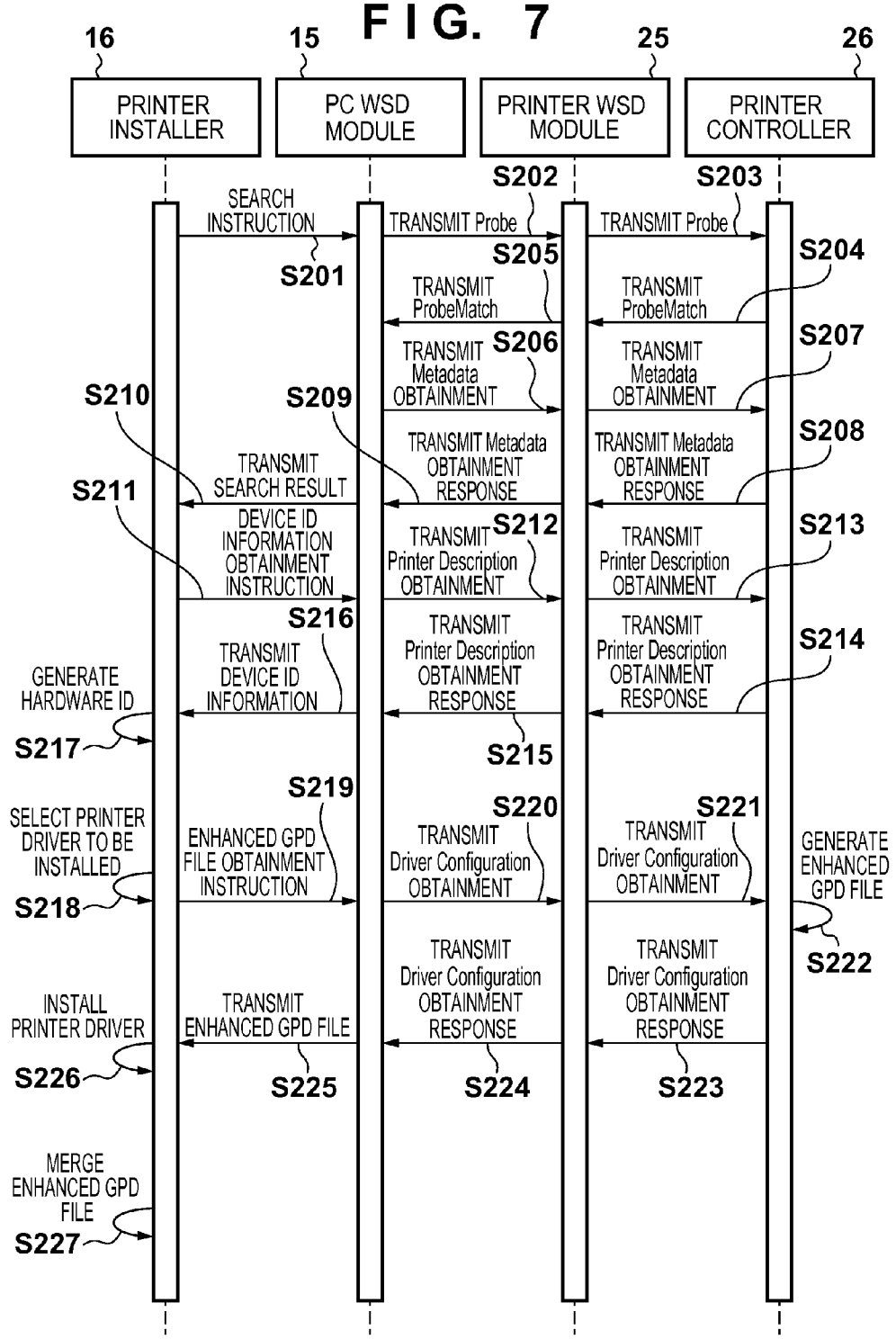
FIG. 7 is a sequence diagram of search processing and installation processing.

With reference to a sequence diagram of FIG. 7, the following describes the flow of search processing and installation processing for a general-purpose printer driver, which are executed by the printing system of the present invention.

First, when the printer installer 16 receives a search instruction from the user, it issues a search instruction to the PC WSD module 15 (step S201). Next, when the PC WSD module 15 receives the search instruction from the printer installer 16, it generates a Probe message and transmits the Probe message to the printer 20 (step S202). While WSD communication of the PC 10 is relayed by the SOAP processor 14, the HTTP protocol stack 13, the TCP/UDP/IP protocol stack 12, the Ethernet controller 11, and the network I/F 105, this explanation will hereinafter be omitted.

Next, upon receiving the Probe message transmitted from the PC 10, the printer WSD module 25 transmits the Probe message to the printer controller 26 and requests the same to generate a ProbeMatch message (step S203). While WSD communication of the printer 20 is relayed by the network I/F 205, the Ethernet controller 21, the TCP/UDP/IP protocol stack 22, the HTTP protocol stack 23, and the SOAP processor 24, this explanation will hereinafter be omitted.

Next, the printer controller 26 generates the ProbeMatch message and transmits the ProbeMatch message to the printer WSD module 25 (step S204). The printer WSD module 25 transmits the ProbeMatch message generated by the printer controller 26 to the PC 10 (step S205). The Probe message is a message that is transmitted to search for WSD-enabled apparatuses connected to the LAN 1, and the ProbeMatch message is a response message for the Probe message.

FIG. 8A shows an example of the Probe message, and FIG. 8B shows an example of the ProbeMatch message. The ProbeMatch message includes printer-related information, such as an apparatus type and a URL for obtaining MetaData. MetaData is data representing a collection of information such as a printer name and a URL of a printer service.

Next, the PC WSD module 15 generates a MetaData obtainment message based on the URL for obtaining MetaData, which has been retrieved from the ProbeMatch message, and transmits the MetaData obtainment message to the printer 20 (step S206). Upon receiving the MetaData obtainment message from the PC 10, the printer WSD module 25 transmits the MetaData obtainment message to the printer controller 26 and requests the same to generate a MetaData obtainment response message (step S207).

The printer controller 26 generates the MetaData obtainment response message and transmits the MetaData obtainment response message to the printer WSD module 25 (step S208). The printer WSD module 25 transmits the MetaData obtainment response message to the PC 10 (step S209).

FIG. 9A shows an example of the MetaData obtainment message, and FIG. 9B shows an example of the MetaData obtainment response message. The MetaData obtainment response message, which serves as a response, includes information such as a printer name and a URL of a printer service.

Upon receiving the MetaData obtainment response message, the PC WSD module 15 transmits information retrieved therefrom, such as the printer name, to the printer installer 16 as a search result (step S210). The above-described steps constitute the search processing. While the PC 10 transmits the messages to the printer 20 in the present embodiment, the present embodiment is not limited to this configuration. For example, a separate management apparatus (not shown) for managing a plurality of printers may be provided, and the PC may inquire this management apparatus about information related to the printers. The subsequent steps of FIG. 7 constitute processing related to the installation.

When the user has input an instruction for installing a printer driver for the printer 20 included in the search result, the printer installer 16 instructs the PC WSD module 15 to obtain device ID information (step S211).

In steps S212 to S215, the PC WSD module 15 transmits a PrinterDescription obtainment message to the printer 20, and obtains a response thereto from the printer controller 26 via the printer WSD module 25. Through these steps, the PC 10 realizes a first obtaining unit for obtaining hardware information.

FIG. 10A shows an example of the PrinterDescription obtainment message, and FIG. 10B shows an example of a PrinterDescription obtainment response message. The PrinterDescription obtainment response message includes detailed information related to printing functions of the printer 20. For example, it includes information indicating whether or not color printing is possible, device ID information, PPM (printing speed) information, and the like.

Next, the PC WSD module 15 transmits the device ID information included in the PrinterDescription obtainment response message to the printer installer 16 (step S216). Upon receiving the device ID information, the printer controller 26 generates the hardware ID 1700 based on the received information (step S217). The device ID information is information that serves as the base of the hardware ID 1700. In the present example, the value of the hardware ID 1700 "IHVPRINTERA" can be obtained by merging the values "MFG:IHV" and "MDL:PRINTERA" included in the device ID information 1001 shown in FIG. 10B.

Next, the printer installer 16 executes processing for selecting a printer driver to be installed, which is shown in the flowchart of FIG. 5 (step S218). Through this selection processing, one of the Inbox driver 171 and the Outbox driver 172 is decided on as the printer driver to be installed. Next, the printer installer 16 issues an instruction for obtaining an enhanced GPD file to the PC WSD module 15, together with model name information of the selected printer driver. In steps S220 to S225, the PC WSD module 15 transmits a DriverConfiguration obtainment message, and obtains a response thereto from the printer controller 26 via the printer WSD module 25. Through these steps, the PC 10 realizes a second obtaining unit for obtaining an enhanced GPD file associated with the printer driver to be installed.

FIG. 11A shows an example of the DriverConfiguration obtainment message. The DriverConfiguration obtainment message is a message for obtaining an enhanced GPD file from the printer 20. It should be noted that, in the present embodiment, the model name information of the printer driver that has been selected to be installed is described in the obtainment message so as to obtain an enhanced GPD file that complies with the selected printer driver. In the example of FIG. 11A, the value "Inbox XPS Model" of the aforementioned model name 17101 is described as a ModelName attribute of a Name element 1101.

In step S222, the printer controller 26 executes generation processing for an enhanced GPD file. FIG. 12 is a flowchart of the detail of the generation processing of step S222.

In step S301, the printer controller 26 receives the model name information. In step S302, the printer controller 26 refers to table information shown in FIG. 13 and judges whether or not there is an enhanced GPD file associated with the model name. If there is an associated GPD file (YES of step S302), the printer controller 26 describes the contents of the associated enhanced GPD file in a DriverConfiguration obtainment response message (step S303). If there is no associated enhanced GPD file (NO of step S302), the printer controller 26 describes a null character string in the DriverConfiguration obtainment response message (step S304).

FIG. 13 shows an example of table information in which model name information is associated with enhanced GPD files. According to the table information of FIG. 13, model names corresponding to the Inbox driver 171 and the Outbox driver 172 are assigned their respective enhanced GPD files. Also, other model names (other) are assigned a null character string (none).

FIG. 11B shows an example of the DriverConfiguration obtainment response message generated in step S303. In a GPDConfigFile element 1102 of the response message, the contents of an enhanced GPD file that complies with a corresponding model is described as character string values. In the example of FIG. 11B, as the Inbox driver 171 is designated in FIG. 11A, the values of the enhanced GPD file 1712 for functional expansion shown in FIG. 6 is accordingly described.

The description now returns to the sequence of FIG. 7. The PC WSD module 15 transmits the enhanced GPD file received from the printer controller 26 to the printer installer 16 (step S225). The printer installer 16 installs the printer driver selected in step S218 (FIG. 5) (step S226), and merges the obtained enhanced GPD file with a GPD file held by the printer driver (step S227).

Through the above processing, functional expansion of a printer driver to be installed can be performed by obtaining an enhanced GPD file that complies with the type of the printer driver. It should be noted that, if "null character strings" are configured in a GPDConfigFile element of a response message, there is no configuration information targeted for expansion, and therefore functional expansion is not performed.

Second Embodiment

A description is now given of a second embodiment of the present invention. In the first embodiment, as shown in FIG. 11A, a DriverConfiguration obtainment message is transmitted with model name information of a printer driver described therein. As another configuration, other information that is effective in identifying the type of a printer driver may be transmitted. Examples of such information include version information of a printer driver and version information of an OS. In some cases, specifications of a printer driver vary depending on the version thereof or the version of an installed OS; in view of this, transmission of such information is helpful for transmission of a compliant enhanced GPD file from the printer 20.

FIG. 14 shows an example of a DriverConfiguration obtainment message describing version information of a driver and version information of an OS. According to the example of FIG. 14, in a Name element 1401, version information of a driver is described as a DriverVer attribute, and version information of an OS is described as an OSVer attribute.

The above configuration makes it possible to not only achieve the effects of the first embodiment, but also obtain a flexible enhanced GPD file appropriate for the specifications of a printer driver.

Third Embodiment

A description is now given of a third embodiment of the present invention. A further example of information that is effective in identifying a printer driver installed in a PC is language configuration information of an OS of the PC installed with the printer driver. It is possible to configure a UI of a printer driver to support multi-language display. The first embodiment does not take into consideration the multi-language support by a function expanded by an enhanced GPD file.

In order to enable an expanded function to perform multi-language display, it is permissible to describe language configuration information of an OS in a DriverConfiguration obtainment message and transmit, from the printer 20, an enhanced GPD file appropriate for the language configuration information as a response. It will be assumed that local information is used here as an example of language configuration information of an OS.

FIG. 15 shows an example of a DriverConfiguration obtainment message describing language configuration information. The example of FIG. 15 is for the case where the language configuration of the OS 112 is Japanese (ja-JP) and its language configuration information is described in a Locale attribute of a Name element 1501.

FIG. 16 shows exemplary contents of an enhanced GPD file transmitted from the printer 20 as a response in the third embodiment. This enhanced GPD file defines JapanesePaper (和紙/washi) as an additional item in relation to the function of PaperType (sheet type), and designates a Japanese character string "和紙 ($64\sim105$ g/m$^2$)" as a displayed name thereof. It is possible to cause UIs of installed printer drivers to display the same language by causing the printer controller 26 to change the portion corresponding to the displayed name in accordance with the designated language configuration information of the OS 112.

The above configuration makes it possible to not only achieve the effects of the first embodiment, but also obtain a flexible enhanced GPD file appropriate for the language configuration of an OS.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-154962, filed Jul. 25, 2013, which is hereby incorporated by reference herein in its entirety.

What is claimed is:

1. A printing system comprising a printing apparatus and an information processing apparatus,
   the information processing apparatus including:
      a first obtaining unit configured to obtain hardware information of the printing apparatus if a printer driver associated with the printing apparatus is installed;
      a deciding unit configured to decide on a printer driver to be installed from among a plurality of printer drivers that are associated with the printing apparatus and differ from one another in specifications based on the hardware information;

a second obtaining unit configured to transmit to the printing apparatus attribute information of the printer driver that has been decided on, and to obtain as a response thereto a configuration file for expanding functions of the printer driver that has been decided on; and a functional expansion unit configured to install the printer driver that has been decided on, and further to perform functional expansion for the printer driver using the obtained configuration file, and the printing apparatus including a providing unit configured to provide the information processing apparatus with the configuration file that has been decided on based on the attribute information received from the information processing apparatus.

2. The printing system according to claim 1, further comprising a management unit configured to manage a plurality of configuration files for expanding respective functions of the plurality of printer drivers in association with attribute information, wherein the providing unit decides on the configuration file to be provided from among the plurality of configuration files managed by the management unit based on the attribute information received from the information processing apparatus.

3. The printing system according to claim 1, wherein the attribute information is identification information of the printer driver.

4. The printing system according to claim 3, wherein the attribute information further includes at least one of a version of the printer driver, a version of an operating system of the information processing apparatus to be installed with the printer driver, and language configuration of the operating system of the information processing apparatus.

5. A control method for an information processing apparatus, comprising:

obtaining hardware information of a printing apparatus if a printer driver associated with the printing apparatus is installed;

deciding on a printer driver to be installed from among a plurality of printer drivers that are associated with the printing apparatus and differ from one another in specifications based on the hardware information;

transmitting to the printing apparatus attribute information of the printer driver that has been decided on, and obtaining as a response thereto a configuration file for expanding functions of the printer driver that has been decided on; and installing the printer driver that has been decided on, and further performing functional expansion for the printer driver using the obtained configuration file.

6. The control method according to claim 5, wherein the attribute information is identification information of the printer driver.

7. The control method according to claim 5, wherein the attribute information further includes at least one of a version of the printer driver, a version of an operating system of the information processing apparatus to be installed with the printer driver, and language configuration of the operating system of the information processing apparatus.

8. A non-transitory computer-readable medium storing a program that causes a computer to execute the steps of:

obtaining hardware information of a printing apparatus if a printer driver associated with the printing apparatus is installed;

deciding on a printer driver to be installed from among a plurality of printer drivers that are associated with the printing apparatus and differ from one another in specifications based on the hardware information;

transmitting to the printing apparatus attribute information of the printer driver that has been decided on, and obtaining as a response thereto a configuration file for expanding functions of the printer driver that has been decided on; and installing the printer driver that has been decided on, and further performing functional expansion for the printer driver using the obtained configuration file.

* * * * *